(12) United States Patent
Peleg et al.

(10) Patent No.: US 9,633,035 B2
(45) Date of Patent: Apr. 25, 2017

(54) STORAGE SYSTEM AND METHODS FOR TIME CONTINUUM DATA RETRIEVAL

(71) Applicant: Reduxio Systems Ltd., Petach Tiqva (IL)

(72) Inventors: Nir Peleg, Beer Yaakov (IL); Amnon Arthur Strasser, Tel Aviv (IL); Or Sagi, Tel Aviv (IL)

(73) Assignee: Reduxio Systems Ltd., Petah Tiqwa (IL)

( * ) Notice: Subject to any disclaimer, the term of this patent is extended or adjusted under 35 U.S.C. 154(b) by 452 days.

(21) Appl. No.: 14/153,369

(22) Filed: Jan. 13, 2014

(65) Prior Publication Data

US 2014/0222772 A1 Aug. 7, 2014

Related U.S. Application Data

(60) Provisional application No. 61/751,878, filed on Jan. 13, 2013.

(51) Int. Cl.
*G06F 17/00* (2006.01)
*G06F 7/00* (2006.01)
*G06F 17/30* (2006.01)
*G06F 3/06* (2006.01)

(52) U.S. Cl.
CPC ...... *G06F 17/30159* (2013.01); *G06F 3/0641* (2013.01); *G06F 17/3023* (2013.01)

(58) Field of Classification Search
CPC ............. G06F 17/30159; G06F 3/0641; G06F 17/3023

USPC ......................................................... 707/703
See application file for complete search history.

(56) References Cited

U.S. PATENT DOCUMENTS

| 5,860,070 | A | * | 1/1999 | Tow ................... G06F 17/30595 707/704 |
| 6,016,553 | A | * | 1/2000 | Schneider ........... G06F 11/1435 714/21 |
| 8,135,678 | B1 | | 3/2012 | Chen et al. |
| 8,140,794 | B2 | | 3/2012 | Prahlad et al. |
| 8,195,623 | B2 | * | 6/2012 | Prahlad ............... G06F 11/1435 707/679 |
| 8,204,860 | B1 | | 6/2012 | Ferguson et al. |
| 8,260,744 | B1 | * | 9/2012 | Chatterjee ........... G06F 11/1451 707/639 |
| 8,271,445 | B2 | | 9/2012 | Hornkvist et al. |
| 8,271,751 | B2 | | 9/2012 | Hinrichs, Jr. |
| 8,271,830 | B2 | | 9/2012 | Erofeev |

(Continued)

*Primary Examiner* — Pavan Mamillapalli
(74) *Attorney, Agent, or Firm* — Pearl Cohen Zedek Latzer Baratz LLP

(57) ABSTRACT

A method and system for storage of a data block for time continuum back-in-time data retrieval. The method comprises receiving a data block from a user node; updating an index stored in a memory respective of a time that the data block was received, wherein the time is a past time for retrieval of the data block; generating a hash number respective of contents of the data block; updating the index with the generated hash number; checking for existence of the generated hash number in a database; upon determination that the generated hash number does not exist in the database saving the data block in a storage device; increasing monotonously a transaction number respective of the generated hash number; and updating the index with the transaction number.

15 Claims, 4 Drawing Sheets

(56) References Cited

U.S. PATENT DOCUMENTS

| | | | |
|---|---|---|---|
| 2007/0043790 A1* | 2/2007 | Kryger | G06F 11/1448 707/999.204 |
| 2007/0208823 A1* | 9/2007 | Shannon | G06F 17/30997 709/217 |
| 2008/0050025 A1* | 2/2008 | Bashyam | G06T 9/002 382/238 |
| 2008/0050026 A1* | 2/2008 | Bashyam | G06T 9/002 382/238 |
| 2011/0161299 A1 | 6/2011 | Prahlad et al. | |
| 2011/0258404 A1 | 10/2011 | Arakawa et al. | |
| 2011/0270800 A1 | 11/2011 | Chou et al. | |

\* cited by examiner

STORAGE SYSTEM AND METHODS FOR TIME CONTINUUM DATA RETRIEVAL

CROSS REFERENCE TO RELATED APPLICATIONS

This patent application claims priority from U.S. provisional patent application No. 61/751,878 filed Jan. 13, 2013, and is hereby incorporated for all that it contains.

TECHNICAL FIELD

The invention generally relates to a data storage system receiving data blocks for storage therein.

BACKGROUND

These days, many techniques are used to improve storage utilization by performing reduction of the number of bytes that are stored therein. A data received is usually compared to the data that already exists in storage for the purpose of identifying duplicate copies of data. This may be done in real-time, which is typically resource intensive, since such a comparison requires comparison with the entire data stored. Alternatively, data is stored and then, through a process known as "dedup" (de-duplication) copies of the same data are removed so as to maintain a single copy that is referenced for use in potentially multiple ways. Another way to reduce the size of data is to perform compression using lossless compression techniques.

While the challenge of storage is significant, the difficulty is compounded in storage systems which need to allow a user to "go back in time" and retrieve data previously stored by users of the data that has subsequently been changed. As it is inefficient to store every change of the data at any given point in time (e.g., every 10 seconds), data snapshots are typically taken.

A data snapshot is taken at a particular point in time and saved in storage. On one hand, snapshots typically require less data than continuously storing all of the data. On the other hand, however, snapshots provide only for discrete points of return which need to be taken or scheduled actively. That is, any data existing only between two snapshot points cannot be retrieved. As a non-limiting example, a snapshot of a computer file system is taken daily at 08:00 and at 20:00. Thus, the file system can be recovered only with respect to these points in time on any particular day. That is, if a failure occurs at 17:00, then the most recent snapshot that can be utilized is the one taken at 08:00. As a result, any data saved to the file system between 08:00 and 17:00 would be lost.

It would therefore be advantageous to provide a solution for efficient time continuum data retrieval.

SUMMARY

Certain embodiments disclosed herein include a method and system for storage of a data block for time continuum back-in-time data retrieval. The method includes receiving a data block from a user node; updating an index stored in a memory respective of a time that the data block was received, wherein the time is a past time for retrieval of the data block; generating a hash number respective of contents of the data block; updating the index with the generated hash number; checking for existence of the generated hash number in a database; upon determination that the generated hash number does not exist in the database: saving the data block in a storage device; increasing monotonously a transaction number respective of the generated hash number; and updating the index with the transaction number.

Certain embodiments disclosed herein include a system and method and retrieval of data in a time continuum back-in-time manner in a time continuum back-in-time manner. The method comprises receiving a request from a user node to retrieve a data block, wherein the data block includes at least a past time respective of the storage of the data block; retrieving a transaction number respective of the past time; retrieving the data block from a storage device using an index that contained the retrieved transaction number; and providing the retrieved data block to the requesting user node.

BRIEF DESCRIPTION OF THE DRAWINGS

The subject matter disclosed herein is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
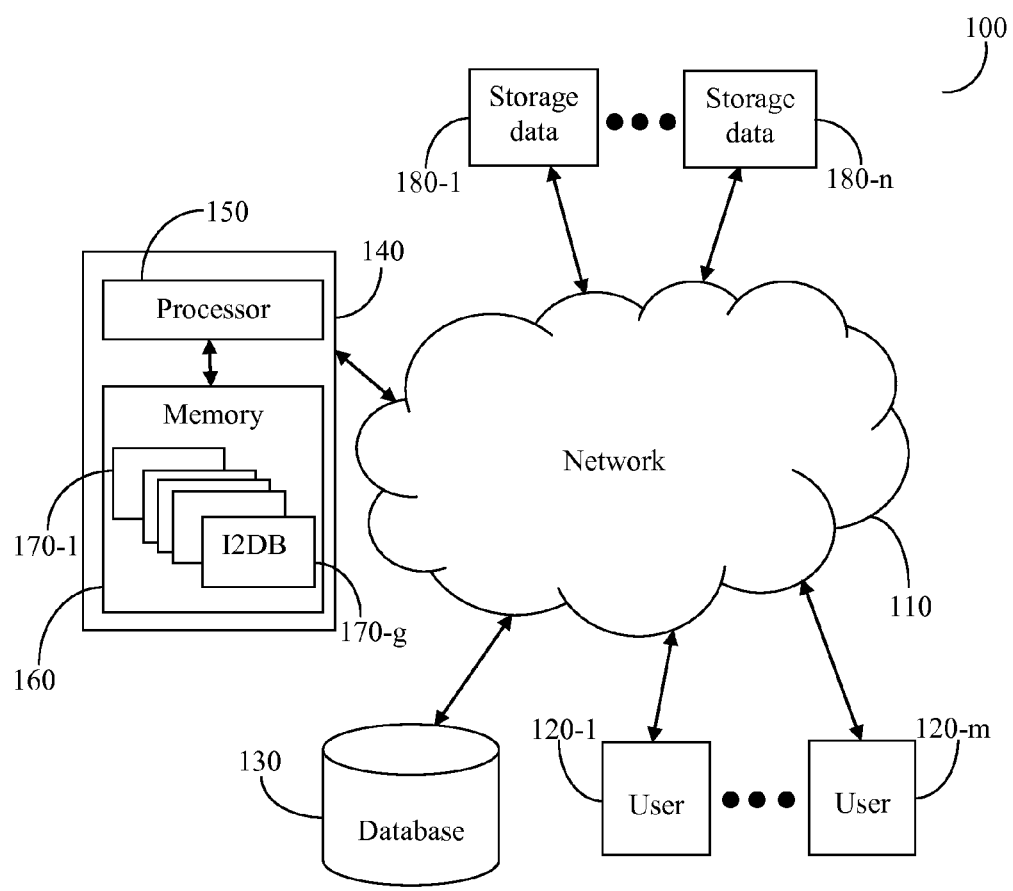
FIG. 1 is a schematic block diagram of a system operative according with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Various exemplary embodiments disclosed herein provide a method and system configured to allow for time-continuum retrieval of data at any desired point of time. In an embodiment, the system is configured to receive a data block and associated metadata and generate a hash number respective of the data block and metadata. The hash number is used to check if the received data block already exists and, if so, indexes the received data block by reference to an existing saved copy rather than actually writing the data block into storage. Otherwise, the system is configured to store the data block, and a transaction number is updated by monotonously increasing the transaction number. The index is updated with information respective thereto that includes a hash number, time of storing the data block, and a transaction number. Retrieval can then be performed by identifying a time and using the data as indexed at that selected time.

FIG. 1 is an exemplary and non-limiting block diagram of a network system 100 utilized to describe the various embodiments disclosed herein. A network 110 is commutatively connected to several components that comprise the system 100. The network 110 can be a local area network (LAN), a wide area network (WAN), a metro area network (MAN), a storage area network (SAN), the worldwide web (WWW), the Internet, implemented as wired and/or wireless networks, and any combinations thereof. The network 110 can facilitate or allow connectivity to any storage networks, storage systems or storage infrastructure. This may include, but is not limited to, a cloud-based storage, a Fibre Channel over Ethernet, a network attached storage, an IP storage system, and a block level storage.

One or more user nodes 120-1 through 120-*m* are communicatively connected to the network 110. Each user node 120-1, 120-*m* may be, for example, but without limitation: a computer node, a personal computer (PC), a notebook computer, a cellular phone, a smartphone, a tablet device, a server, and the like. A server 140 is also communicatively connected to the network 110. The server 140 includes a processor, or processing unit, 150, and a memory 160 that contains a plurality of instructions executed by the processor 150. The memory 160 further contains at least one or more indexes 170-1 through 170-*g*. Each such index 170 provides in part a reference to a data block (index to database (I2DB)) received from at least a user node, for example, user node 120-1. It should be understood that each index 170-1 through 170-*g* may represent a different data block, where 'g' is an integer equal to '1' or greater.

The system 100 also includes a database 130 of information regarding hash numbers. The database 130 may be an integral part of the memory 160, or a separate entity connected to the network 110. Further, one or more storage devices 180-1 through 180-*n*, are communicatively connected to the network 110, where 'n' is an integer equal to '1' or greater. Each one of the storage devices 180-1 through 180-*n* is configured to store at least a copy of a data block. The storage devices 180 may be any kind of storage capable of storing the data blocks pointed to by the indexes 170.

In an embodiment, the server 140 is configured to receive, from a user node 120, the data block and at least a metadata respective of the data block. The metadata includes attributes related to the metadata, such as block size, an identifier, date of creation, modification data, and so on. The server 140 is further configured to update an index, for example, index 170-1 respective of the time that the data block is received. The server 140 is also configured to compute a hash function to generate a hash number respective of the data block and to save the hash number in the database 130.

In an embodiment, a hash function providing a unique representation of each data block and the time the data block was received may be used. For instance, in order to create a hash number, a cryptographic hash function to the block data itself can be used. This results in a hash number of a desired size that depends on the exact hash function and its respective parameters. In a very high probability, the result is unique to the input data. For example, and not by way of limitation, a data block having 4,096 bytes may be configured to produce a 256-bit set of hash numbers using the SHA-3 algorithm. The operation of a hash function can be demonstrated by applying the same hash function on slightly different input data. In a first case, the following hash function 'Keccak-256' is applied on an input data "The quick brown fox jumps over the lazy dog": Keccak-256 ("The quick brown fox jumps over the lazy dog") The resultant hash number is: 0x4d741b6f1eb29cb2a9b 9911c82f56fa8d73b04959d3d9d222895df6c0b28aa15 However, if a slightly different input is used, in this case a period at the end of the sentence so that the input data is: Keccak-256("The quick brown fox jumps over the lazy dog.") The resultant hash number is: 0x578951e24efd62a 3d63a86f7cd19aaa53c898fe287d2552133220370240b572d As can be noticed, this result is completely different hash number from the hash number generated for the first input data. This example shows a key feature of secure hash functions, namely the avalanche effect. Two almost identical input blocks with minor variations produce completely different hash numbers.

According to one embodiment, the server 140 is configured to determine as wheatear the received data block should be saved in a storage device 180. To this end, the server 140 may analyze the hash number respective of the information stored in the database 130 by identifying previously handled database's 130 entries and not previously handled entries. For each entry in the database 130 not previously handled for storage in a storage device 180, the server 140 is configured to save a copy of the data block in a storage block, for example, storage device 180-1. In an embodiment, the server 140 may perform compression actions i.e., compress the data block into one or more compressed data block, and/or map either the data block or the compressed data block into the storage device 180-1. The copy of the data block saved in the storage device 180-1 is equal to the data block or smaller than the data block.

In addition, a transaction number is increased monotonously to update a number of transactions performed by the server 140. Moreover, the index 170-1 is updated with the transaction number and the hash number of the respective data block. The server 140 is configured to store the hash number as an entry in the database 130. An illustration of the operation of the index generation upon writing to a storage device is further discussed in FIG. 4.

In one embodiment, the server 140 is configured to identify a previously handled entry as a not previously handled entry due to a change in the hash number. Each one of the indexes 170-1, 170-*g* includes a reference respective of a data block. The reference is comprised of the transaction number, the hash number, and the time at which the data block is received. Thus, the index enables continuum retrieval of data back-in-time, the retrieving process described in grater details with respect of FIG. 3.

It should be noted that a single server 140 is illustrated in FIG. 1 just for the sake of simplicity of the description. The embodiments disclosed herein can be carried out by a plurality of servers of the type of server 140, thereby creating a system comprising distributed servers.

Figure 2:
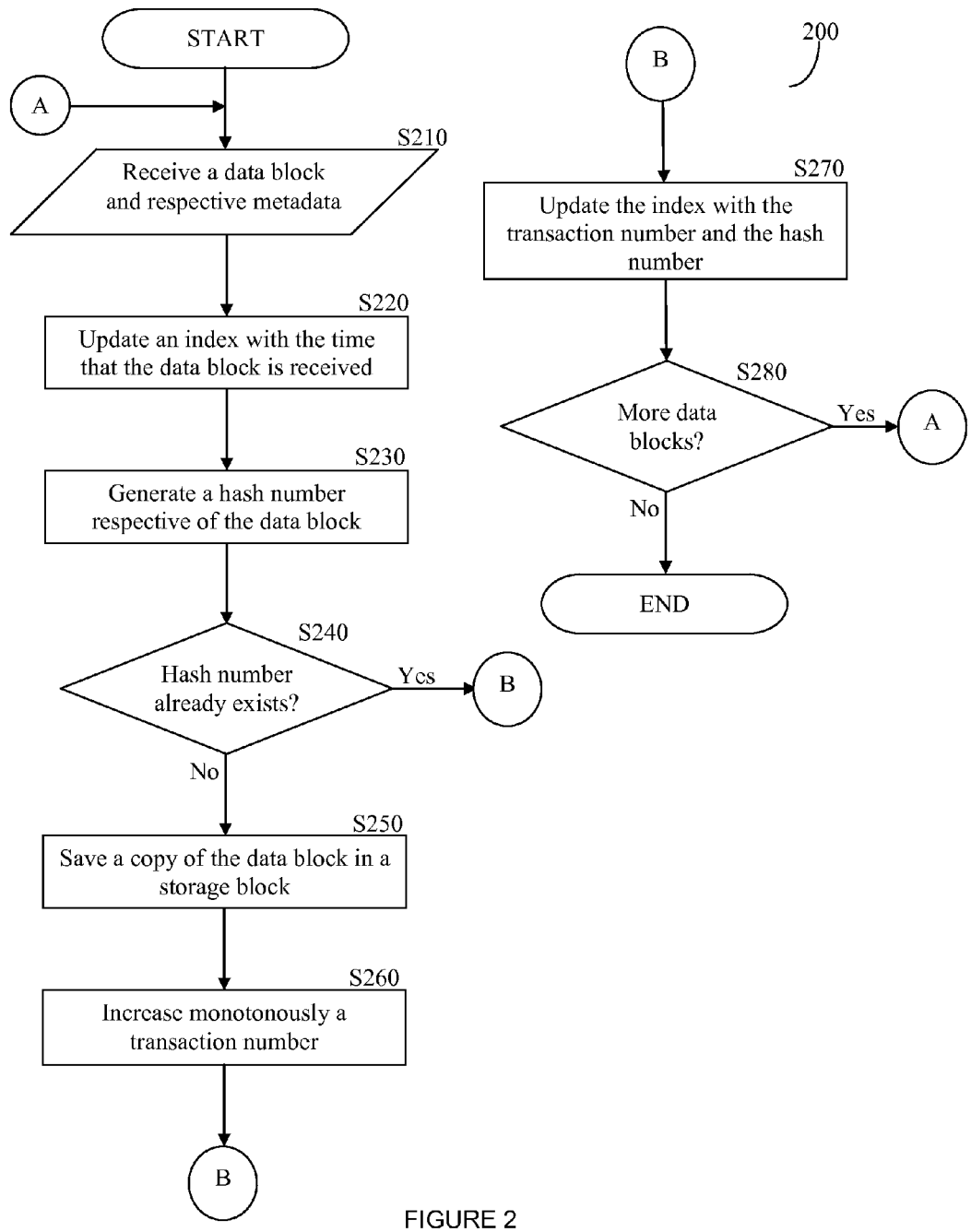
FIG. 2 is a flowchart describing the operation of updating an index according to an embodiment.

FIG. 2 shows an exemplary and non-limiting flowchart 200 describing a method of updating an index according to an embodiment. The update index enables the continuum retrieval of data block back-in-time. As noted above, each index 170-1, 170-*g* provides in part a reference to a data block received from at least a user node, for example, user node 120-1. In an embodiment, the method is performed by the server 140.

In S210, a data block and metadata respective of the data block are received from a user node, e.g., node 120-1. The data block may be, for example, contained in a file created by a user node 120-1, which is later changed by a different user node (e.g., node 120-*n*) or by the same user node. The data block and metadata may be received for the first time at the user node.

In S220, an index 170, for example index 170-1, is updated respective of the time that the data block is received. In an embodiment, it is not necessary to index the time for each and every transaction and it would suffice to store the time only in a predefined clock granularity, for example, once per second, or once per $1/10^{th}$ of a second, as the case may be, even if multiple transactions occurred within that time period. In one embodiment, the index may also include an address of the data block and/or an identifier of the data block.

In S230, a hash number respective of the received data block and/or the reception time is computed. In an exemplary embodiment, the hash number is computed using the hash functions discussed above. In S240, it is checked whether the hash number already exists in the database 130 and, if so, execution continues with S270; otherwise, execution continues with S250.

In S250, a copy of the received data block is saved in one of the storage devices 180-1, 180-n. In S260, a transaction number is monotonously increased. In S270, an index associated with the received data block (e.g., index 170-1) is updated with reference information regarding the storage block. The reference information includes the hash number and the transaction number. In S280, it is checked whether additional data blocks have been received and, if so, execution continues with S210; otherwise, execution terminates.

Figure 3:
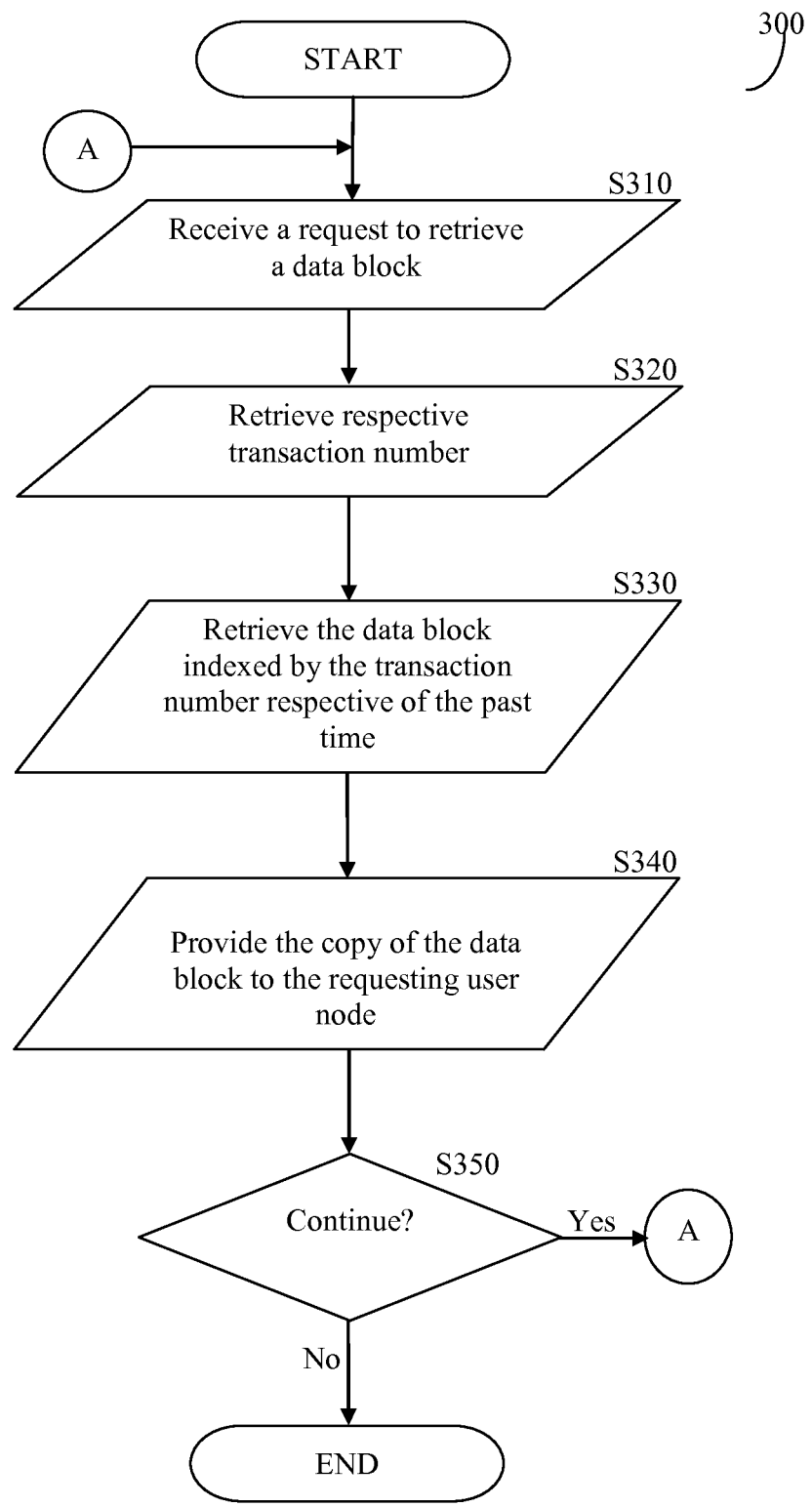
FIG. 3 is a flowchart describing the operation of retrieving a copy of a data block according to an embodiment.

FIG. 3 shows an exemplary and non-limiting flowchart 300 describing the operation of retrieving a copy of a data block according to an embodiment. In S310, a request to retrieve a data block is received, for example, from a user node 210-1. The request includes at least a past time respective of a data block that should be retrieved. The past time may be designated as an hour of the data (to the granularity of second or minutes) or a time interval from the creation of the data block or since a last change of the data block. As a non-limiting example, a requested time may be 8:30:45, or 5 hours since the creation of the date block.

In S320, a transaction number respective of the past time is retrieved. It should be noted that within a time period there are several transactions, each of which is identified by a unique, monotonously increasing number. In an embodiment, the transaction number included in an index that indexed a time closest to the past time and designates the address and/or identifier of the data block is retrieved. An example for S320 is provided below with reference to FIG. 4.

In S330, the data block indexed by the transaction number respective of the past time is retrieved from the storage device 180. As noted above, an index provides in part a reference to a data block (I2DB). In S340, the retrieved copy of the data block is provided to the requested user node. In S350, it is checked whether there are additional copies of data blocks to be retrieved, and or requested by the user nodes, and if so execution continues with S310; otherwise, execution terminates.

Figure 4:
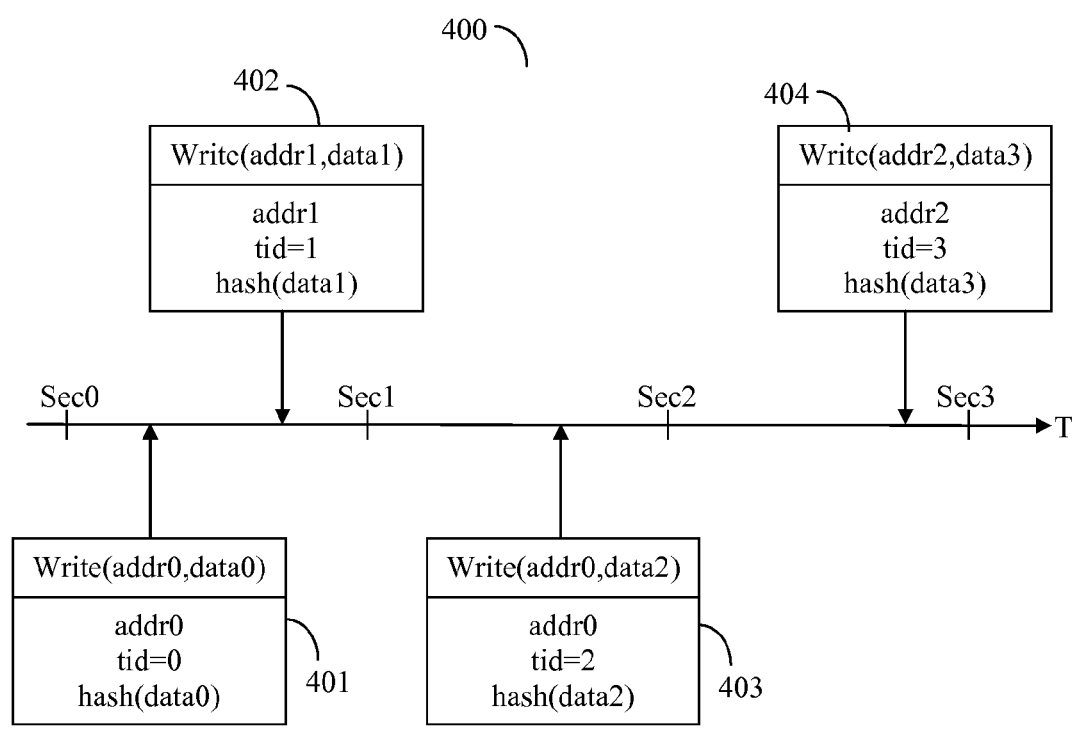
FIG. 4 is a diagram showing a write into storage operation according to an embodiment.

FIG. 4 shows an exemplary and non-limiting diagram 400 showing the write into storage operation according to an embodiment. Time is kept in this example every second and the transactions start at T=Sec0 (i.e., at 0 seconds). In the first second (between Sec0 and Sec1) there are two write transactions 401 and 402 to addresses 'addr0' and 'addr1,' respectively. As a result of the order in which the transactions began, those transactions receive transaction numbers (tid) of '0' and '1,' respectively, thereby ensuring a monotonously increasing tid for each transaction. In addition, an index is generated for each of the respective data blocks 'data0' and 'data1'. In the subsequent second (between Sec1 and Sec1), 'data2' is written to 'addr0' resulting in a tid=2 for the transaction 403, and a new index respective of 'data2' is created. In the third second (between Sec2 and Sec3), 'data3' is written to 'addr2' resulting in a tid=3 for the transaction 404, and a new index respective of 'data3' is created.

As a result, at any time subsequent to the transactions 401 through 404 shown, a read operation of read(addr0, sec1) results in read(addr0,tid=0) related to transaction 401, which retrieves hash(data0) and, in turn retrieves data0. That is, sec1 matches any tid>=0 and <2. By comparison, a read (addr0,sec2) means read(addr0,tid=2) that retrieves hash (data2) which in turns retrieves data2. That is, sec2 matches any tid>=2 and <3.

The various embodiments disclosed herein can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analog circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for storage of a data block for time continuum back-in-time data retrieval, comprising:
    receiving a data block from a user node;
    updating an index stored in a memory respective of a time that the data block was received, wherein the time is a past time for retrieval of the data block;
    generating a hash number respective of contents of the data block;
    updating the index with the generated hash number;
    checking for existence of the generated hash number in a database;
    upon determination that the generated hash number does not exist in the database:
    saving the data block in a storage device;
    increasing monotonously a transaction number respective of the generated hash number;
    updating the index with the transaction number;
    receiving a request to retrieve the data block, the request including at least a past time respective of the data block to be retrieved;

retrieving the transaction number respective of the past time;

retrieving the data block from the storage device using the index that contains the retrieved transaction number; and providing the retrieved data block.

2. The method of claim 1, wherein the database includes previously stored hash numbers.

3. The method of claim 2, wherein generating a hash number further comprises:

receiving at least a metadata associated with the data block; and generating the hash number respective of the metadata and contents of the received data block.

4. The method of claim 1, wherein saving the data block further comprising:

compressing the data block into a compressed data block; and mapping into the storage device any one of: the data block and the compressed data block.

5. The method of claim 1, further comprising: retrieving the data block in a time continuum back-in-time manner.

6. A non-transitory computer readable medium having stored thereon instructions for causing one or more processing units to execute the method according to claim 1.

7. The method of claim 1, wherein the request includes at least one of: an address of the data block, and an identifier of the data block.

8. The method of claim 1, wherein retrieving the transaction number further comprises:

retrieving the transaction number included in an index that indexes a time closest to the past time and designates at least one of the address and identifier of the data block.

9. A system for storage of a data block for time continuum back-in-time data retrieval, comprising:

a network interface communicatively connected to at least a user node and storage device through a network;

a memory connected to the processor, containing a plurality of instructions that when executed by the processor configure the system to:

receive a data block from the user node;

update an index stored in a memory respective of a time that the data block was received, wherein the time is a past time for retrieval of the data block;

generate a hash number respective of contents of the data block;

update the index with the generated hash number;

check for existence of the generated hash number in a database, and upon determination that the generated hash number does not exist in the database:

save the data block in a storage device;

increase monotonously a transaction number respective of the generated hash number;

update the index with the transaction number receive a request from a user node, the request including at least a past time respective of the data block to be retrieved;

retrieve the transaction number respective of the past time;

retrieve the data block from the storage device using an index that contains the retrieved transaction number; and provide the retrieved data block to the requesting user node.

10. The system of claim 9, wherein the network is at least one of: a local area network (LAN), a wide area network (WAN), a metro area network (MAN), a storage area network (SAN), the world wide web (WWW), the Internet, and combinations thereof.

11. The system of claim 9, wherein the system is further configured to: save the generated hash number in the database upon determination that the generated hash number does not exist in the database, wherein the database includes previously stored hash numbers.

12. The system of claim 9, wherein the system is further configured to:

receive at least a metadata associated with the data block; and generate the hash number respective of the metadata and contents of the received data block.

13. The system of claim 9, wherein the system is further configured to:

compress the data block into a compressed data block; and map into the storage device any one of: the data block and the compressed data block.

14. The system of claim 9, wherein the system is further configured to: retrieve the data block in a time continuum back-in-time manner.

15. The system of claim 9, wherein the network is at least one of: a local area network (LAN), a wide area network (WAN), a metro area network (MAN), a storage area network (SAN), the world wide web (WWW), the Internet, and combinations thereof.

* * * * *